No. 611,510. Patented Sept. 27, 1898.
J. ROBINSON.
PNEUMATIC TIRE.
(Application filed Mar. 14, 1898.)
(No Model.)
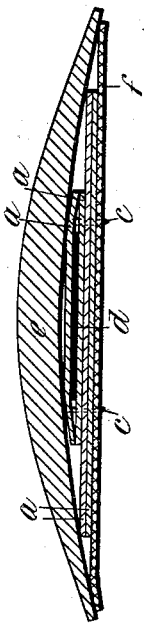
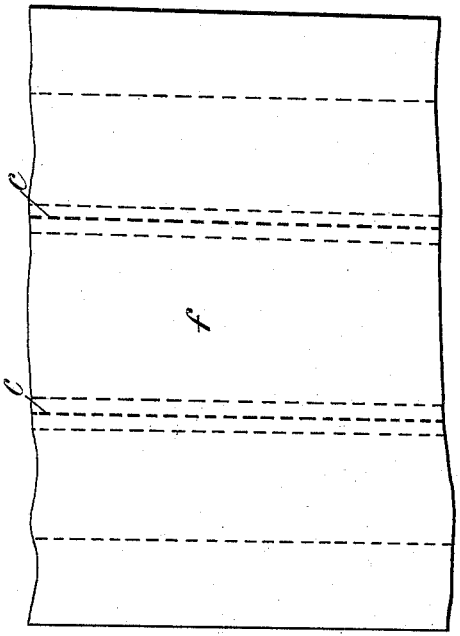
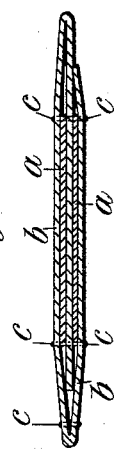
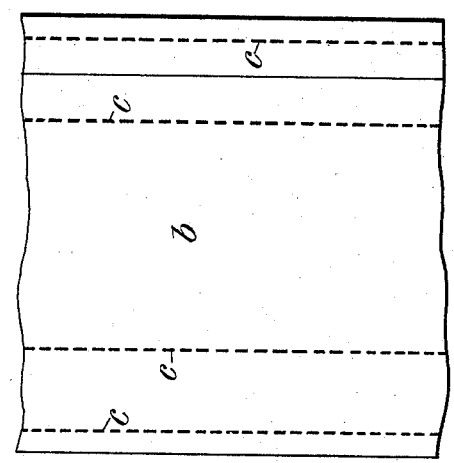
Witnesses
Inventor
Joseph Robinson
By James L. Norris
Atty

UNITED STATES PATENT OFFICE.

JOSEPH ROBINSON, OF IPSWICH, ENGLAND, ASSIGNOR TO EUGENE WELLS AND PERCY CROSSMAN, OF SAME PLACE.

PNEUMATIC TIRE.

SPECIFICATION forming part of Letters Patent No. 611,510, dated September 27, 1898.

Application filed March 14, 1898. Serial No. 673,856. (No model.)

*To all whom it may concern:*

Be it known that I, JOSEPH ROBINSON, engineer, a subject of the Queen of Great Britain, residing at 84 Suffolk road, Ipswich, in the county of Suffolk, England, have invented certain new and useful Improvements in and Relating to Pneumatic Tires, of which the following is a specification, reference being had to the accompanying drawings.

My invention has for its object to provide improved means for protecting the air-tubes of pneumatic tires against puncture.

According to my invention I employ a band or strip of suitable fabric treated or impregnated with a solution of celluloid, xylonite, or the like. I combine with such impregnated fabric thin sheets or strips of solid celluloid or the like in the manner hereinafter described and claimed. Any suitable number of these prepared strips are arranged between the air-tube and the tread of the tire, according to the size of the tire and the kind of vehicle to which it is to be applied, and such strips may be employed separately in the form of a detachable puncture-proof band capable of being employed with any existing double-tube tire, or they may be supplied to tires during their manufacture, so as to be integral therewith.

In the accompanying drawings I have illustrated in Figures 1 and 2 one form of detachable band, and in Figs. 3 and 4 one form of tire-cover, constructed according to my invention; but I desire it to be understood that I do not limit myself to any precise arrangement of band or cover.

Referring to Figs. 1 and 2, which are respectively a cross-section and a plan of my puncture-proof band, *a a* are strips of flax, linen, or similar fabric impregnated with celluloid or the like, and *b* is a broad strip of similar material folded upon itself, so as to inclose the strips *a*. This strip *b* may or may not be treated with celluloid; but I prefer to treat it therewith on the side or surface that is folded inwardly. The component parts of the band are placed together before the celluloid or other impregnating substance has become dry or solidified, so that the said parts will adhere. In some cases, however, I may allow the strips to dry separately and then cement them together with india-rubber solution. I prefer to further secure the parts together by stitches *c c*.

Referring to Figs. 3 and 4, which are respectively a cross-section and an under side plan of my puncture-proof cover, *e* is a strip of vulcanized rubber forming the tread of the tire, and *f* is the canvas backing or lining thereof. Between the tread and its lining I arrange strips *a a* of fabric impregnated with celluloid or the like, similar to the strips *a* in Figs. 1 and 2. I prefer to cement these strips together in pairs and to superpose or cement together a number of pairs of strips, each superposed pair being narrower than that to which it is secured and the widest strips being placed adjacent to the air-tube. The strips *a* may be held in place by being cemented or stitched to the lining before the rubber tread is secured thereon. In the drawings I have shown two lines of stitches *c c*. If desired, the lining *f* may also be treated with celluloid.

The impregnation or treatment of the fabric is effected by applying to each strip a solution of celluloid, xylonite, or the like in acetone by means of a brush or by immersing each strip in the solution, preferably contained in an air-tight bath or cylinder. In the latter case I may place the solution under pressure, so as to cause it to more thoroughly penetrate the fibers of the fabric.

In some cases I may place strips of solid celluloid or xylonite between the prepared fabric strips. I thus obtain a band of great strength or resistance to penetration. Such solid strips are preferably placed between the strips of fabric immediately after their immersion in the solution, so that in drying the fabric and celluloid strips adhere firmly together. In Figs. 3 and 4 I have shown such a strip of celluloid *d* inserted between the outer or upper pair of strips *a*. It is obvious that one or a number of such strips may also be employed in combination with the strips *a* in Figs. 1 and 2.

What I claim is—

1. The combination with a pneumatic tire, of a series of superimposed strips of fabric impregnated with celluloid, such strips being of different widths, and the wider strips being arranged nearest the air-chamber, substantially as and for the purpose specified.

2. The combination with a pneumatic tire of a plurality of superimposed strips of fabric impregnated with celluloid, and of one or more strips of solid celluloid arranged between the strips of impregnated fabric, substantially as and for the purpose specified.

3. The new article of manufacture for employment with a pneumatic tire consisting of a plurality of strips of fabric impregnated with celluloid and inclosed in the folds of another strip of fabric, substantially as and for the purpose specified.

In testimony whereof I have hereunto set my hand this 22d day of February, 1898.

JOSEPH ROBINSON.

Witnesses:
CHARLES H. DOWNES,
A. E. WOOD.